Nov. 24, 1964 T. P. GOODMAN 3,158,038
ROTOR VIBRATION REDUCING DEVICE
Filed Dec. 18, 1961 2 Sheets-Sheet 1
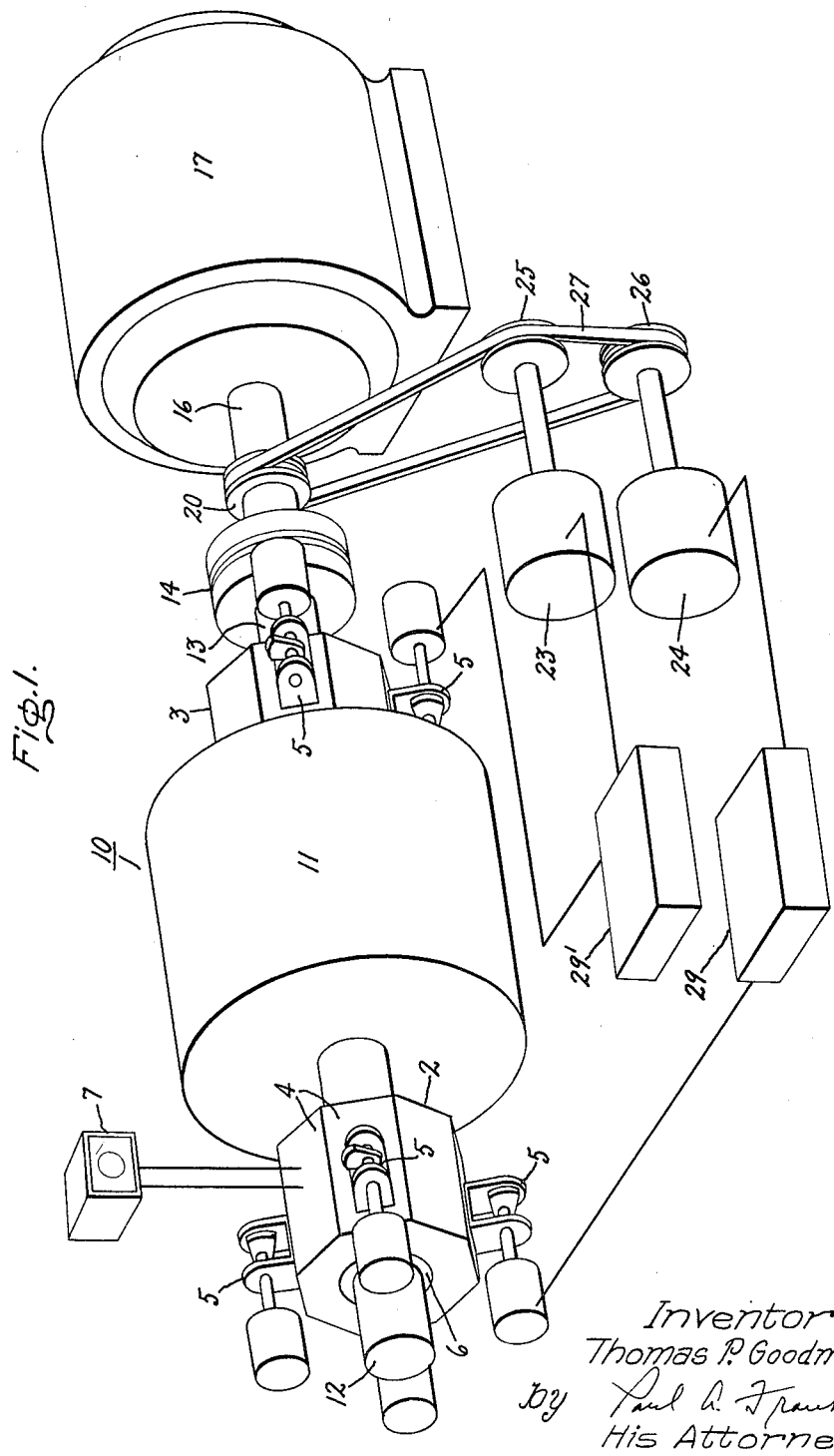
Inventor
Thomas P. Goodman
by Paul A. Frank
His Attorney Nov. 24, 1964   T. P. GOODMAN   3,158,038
ROTOR VIBRATION REDUCING DEVICE
Filed Dec. 18, 1961   2 Sheets-Sheet 2
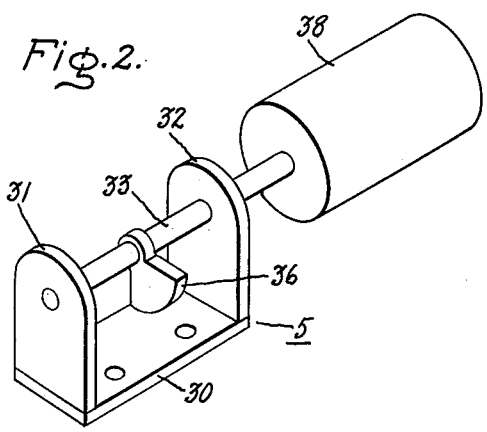
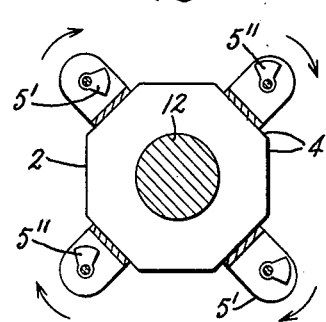
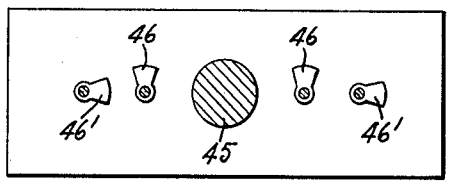
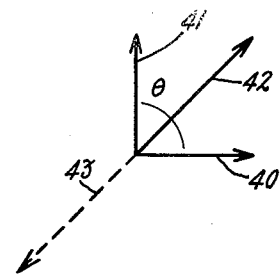
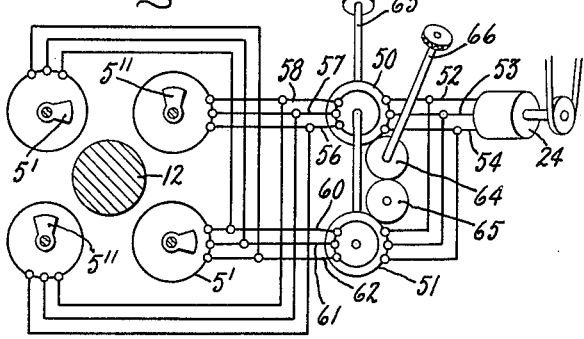
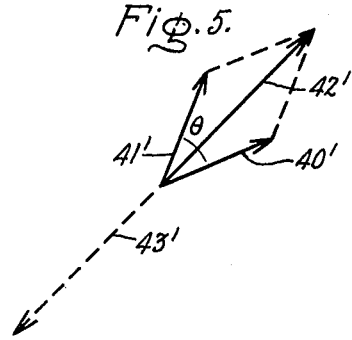
Inventor:
Thomas P. Goodman,
by Paul A. Frank
His Attorney.

3,158,038
ROTOR VIBRATION REDUCING DEVICE
Thomas P. Goodman, Schenectady, N.Y., assignor to General Electric Company, a corporation of New York
Filed Dec. 18, 1961, Ser. No. 160,182
13 Claims. (Cl. 74—573)

The present invention relates to the reduction of vibration due to unbalance in rotors, and more particularly, to the reduction of vibration in rotors by means of force canceling devices associated with the rotor bearings.

Unbalance in rotating machinery not only may cause dangerous stresses in the apparatus itself, but is also a source of noise and vibration which may affect adjacent structures and equipment. The penalties for undue noise and vibration aboard naval craft is particularly severe and accordingly, special attention must be directed to ameliorate unbalance conditions.

Usually, the major source of noise and vibration from rotating machinery is the rotor of the apparatus. Accordingly, it is the general practice to devote special care to balancing the rotors before installation. However, even after installation, it is common to find that unbalance forces in the apparatus are greater than previously measured. These increased forces may be due to mounting and loading conditions, changes in balance conditions due to wear, accumulation of dirt, etc. Furthermore, these conditions may also vary with operating conditions due to factors such as rotor distortion, eccentricity, output loads, modes of operation, and mounting elasticity which may vary at different rotor speeds.

Consequently, it often becomes desirable to provide means for minimizing vibration under varying operating conditions. One approach which has been utilized is the adjustable mass correcting device mounted on the rotor itself. Unfortunately, such devices require adjustment while the rotatable member is in motion. This is not only inherently difficult but furthermore should the device become inoperative, the unbalance conditions may become unduly severe.

It is, therefore, preferable, in some instances, to minimize the vibration by utilizing force canceling devices associated with the bearings or frame of the apparatus or other stationary portion thereof in such a manner that any inoperativeness of correcting device will only minimally affect the rotor in the event of device failure.

The chief object of the present invention is to provide an improved force canceling device.

Another object of the invention is to provide an improved force canceling device for unbalanced rotors.

A further object of the invention is to provide an improved force canceling device to be mounted on the bearing pedestals of an apparatus.

A still further object of the invention is to provide a method and apparatus for canceling the unbalance of a rotor by adjusting the rotatable motion of a plurality of unbalance weights located on a stationary portion of the apparatus.

These and other objects of my invention may be more readily perceived from the following description.

One of the features of my invention is directed to a rotor having a shaft which is mounted in a bearing having associated therewith force counteracting means. The force counteracting means may include a pair of rotatable weights having their axes located on opposite sides of the shaft axis and having the weights thereof rotating to provide forces adapted to counteract any periodic forces generated during rotation of the rotor. Additional pairs of rotatable weights may also be employed to control the magnitude and frequency of such counteracting forces.

The attached drawings illustrate preferred embodiments of the invention, in which:

FIGURE 1 is a perspective, partially diagrammatic, view of an apparatus for practicing the present invention;

FIGURE 2 is a perspective view of a synchro motor driven counterweight for utilization on a bearing pedestal;

FIGURE 3 is a diagrammatic view showing the force canceling characteristics of one of the bearing pedestals of the present invention;

FIGURES 4 and 5 are force vector diagrams showing the centrifugal force vector orientations which generate equal and opposite forces to the unbalance forces in the rotor to cancel unbalance;

FIGURE 6 is a diagrammatic view of another embodiment of the invention;

FIGURE 7 is a schematic view showing the synchro generator, synchro differential transformers, and synchro motors associated with the counterweights and the means for changing the relationship between the weights.

Referring to the drawings in more detail, there is shown in FIGURE 1 a perspective, partially diagrammatic view of an apparatus employing the present invention. The apparatus may include first bearing pedestal 2 and second bearing pedestal 3, these bearing pedestals preferably being of substantially the same construction. Considering the first bearing pedestal 2, there is shown a construction having a substantially octagonal across section with a center bearing portion 6 adapted to engage a suitable shaft. The type of bearing utilized may be a journal bearing, rolling element bearing, or other type bearing. The pedestal may have a plurality of sides 4, these sides having portions being substantially equidistant from the center axis of the bearing so that a plurality of synchronously driven counterweight constructions 5 may be mounted thereon in suitable pairs, each pair being diametrically opposed from the bearing axis for a purpose more fully described hereinafter. Since under normal circumstances, this pedestal is providing support for a normally unbalanced load, the counterweight constructions are intended to provide forces to substantially cancel the unbalance. In order to determine this condition of unbalance, suitable probes and indicating equipment 7 may be provided preferably associated with the shaft without affecting the rotation thereof.

These probes may be of the type commonly known as accelerometers, velocity pickups, or proximity gages which are electric type gages that do not interfere with the rotor movement. If desired, optical type pickups may be utilized.

As previously noted, pedestals 2 and 3 may be of a similar construction and they are adapted to support rotor 10 which comprises a load portion 11 having extending therefrom first shaft portion 12 supported by pedestal 2 and second shaft portion 13 supported by pedestal 3. Rotation of the rotor, because of its unbalance, transmits vibration and noise which are dispersed through the bearing constructions to adjacent structures. It is desirable to reduce the vibration either by balancing the rotor or by dynamically canceling the forces created by the rotor, either in the rotor itself or in adjacent portions of the apparatus. In the present embodiment, force cancellation is achieved at the bearing pedestals. The force canceling means may comprise counterweights rotating at the same speed as the rotor and applying forces to the rotor in a manner to create an equal and opposite vector force to cancel the unbalance force generated in the rotor.

In the disclosed embodiment, to rotate rotor 10, shaft 13 may be attached through coupling 14 to shaft 16 of drive motor 17. To generate canceling forces in the bearing pedestals, it is desirable to have an electrical, hydraulic, pneumatic, or mechanical system for driving the counterweight constructions 5. In the present embodiment the driving function is performed electrically by driving synchro motors through synchro generators 23 and 24 which have associated therewith pulleys 25 and 26 connected to pulley 20 mounted on shaft 16 by means of a suitable chain or belt 27. In FIGURE 1, synchro generator 24 is associated with the unbalance weight constructions 5 through the differential transformers 29. The synchro motors on pedestal 3 are associated with synchro generator 23 through differential transformers 29′.

FIGURE 2 illustrates a counterweight construction 5 which consists of a base portion 30 adapted to be bolted or otherwise attached on the bearing pedestal. Preferably, the constructions 5 are mounted in pairs so that the weights of each pair are equally spaced from the rotor axis and are diagonally opposed in a manner that the resulting centrifugal force caused by the unbalance is effectively acting through the center axis of the rotor. Extending upwardly from base 30 may be a pair of bearing pedestals 31 and 32 adapted to support shaft 33 which has mounted thereon counterweight 36 located intermediate pedestals 31 and 32. In order to drive unbalance weights 36, shaft 33 may be connected either directly or through a suitable coupling to synchro motor 38 which is associated preferably through differential transformers 29 to synchro generator 24.

In FIGURE 3 there is shown a diagrammatic view illustrating the action of the counterweights acting on pedestal 2 wherein is mounted shaft 12 associated with rotor 10, the rotor being unbalanced and consequently applying rotating vector forces through the bearing pedestal and dispersing this vibration and noise to adjacent structures. In order to reduce this vibration, it is desirable to apply at the rotor axis a canceling force which is equal and opposite to the unbalance force. In the present embodiment, this may be achieved by pairs of weights, for example, a first pair 5′ and a second pair 5″. It is noted that the octagonal cross-section pedestal provides surfaces for mounting the counterweight constructions illustrated in FIGURE 2 in a manner that all the weights are equidistant from the rotor axis. In this manner, the axes of the first pair of counterweight constructions 5′ are equally spaced from the rotor axis and are diametrically opposed with respect to this axis. A second pair of weights 5″ which are also diametrically opposed and equally spaced from the rotor axis may be disposed normally to the first pair of weights. Noting the orientation of the weights of each pair, it can be seen that weights in each pair have the same angular disposition. In this manner, the centrifugal forces generated by each pair of weights are equivalent to a resultant force acting midway between the weights or at the rotor axis. Thus, the orientation of the weights illustrated in FIGURE 3 generates the vector diagram shown in FIGURE 4. Weights 5′ at a particular instant created a force illustrated by vector 40 and this force is equal to the sum of the centrifugal forces of each of the two counterweights and the direction illustrated is horizontal. The action of weights 5″ is in a generally vertical direction shown by vector 41. The resultant force of vectors 40 and 41 is vector 42 (as determined by the parallelogram of forces) being equal and opposite to the unbalance force 43 generated by the rotor. Vector 43 which is equal to vector 42 has a phase difference of 180 degrees. It is noted that the angular orientation between forces 40 and 41, namely, angle $\theta$, determines the magnitude of the force generated by the counterweight constructions. Naturally, should the weights have the same angular disposition, a maximum of force is generated and similarly, it is noted that should one pair of weights be 180 degrees out of phase from the other pair, the actions of the counterweights cancel out and have no effect on the rotor.

In FIGURE 5 there is shown another vector diagram resulting from a different orientation of weights wherein the weights 5′ generate a vector force 40′ and the weights 5″ generate a vector force 41′. The parallelogram indicates a resultant force 42′ which has the same angular disposition as shown in 42 but because of the smaller angle $\theta$ between vectors 40′ and 41′, the magnitude of force 42′ is substantially greater than 42. This force is designed to counterbalance force 43′.

While the weights 5′ and 5″ in FIGURE 3 are shown disposed at 90 degree intervals, it will be appreciated that different orientations of weights are possible within the scope of the present invention. In FIGURE 6, shaft 45 of an unbalanced rotor has a bearing pedestal containing two pairs of rotating counterweights 46 and 46′ which are horizontally disposed and the weights of each pair are equidistant from the rotor axis. It is appreciated that by this orientation, the resultant force from each pair of weights acts at the axis of the unbalanced rotor and that the four weights together apply a force having a magnitude equal and opposite to the unbalance force generated in the rotor. It is appreciated further that in the embodiment shown in FIGURES 1, 3, and 6, the bearing pedestal is preferably an extremely rigid member and the counterweight axes are preferably close to the rotor axis so that the forces acting through the pedestal are transmitted therethrough to act on the desired resultant point, namely, the rotor axis. If any substantial deflection occurs in the pedestal, the desired effect may not be achieved because of uncontrolled movement of the pedestal.

Since the unbalance in the rotor may be due to a number of reasons, for example, differences in density in the rotor, the geometry of the rotor, etc., it is appreciated that the unbalance sensed by pedestal 2 may be of a different magnitude and a different phase than that experienced by pedestal 3. Accordingly, the weights on pedestal 3 although rotating in synchronism with the rotor may have a different angular orientation and may also have a different magnitude from those on pedestal 2.

From the previous consideration of FIGURES 4 and 5, it is apparent that a fixed angular orientation between the pairs of rotating weights may create a predetermined canceling force and differential transformers associated with a synchro motor and synchro generator system may be utilized to provide a desired angular orientation between the weights to generate a desired canceling force. Accordingly, the transformers may be calibrated to provide this function. Furthermore, a consideration of FIGURES 1–6 immediately indicates a further need for placing the canceling forces in a 180° out-of-phase relationship with the unbalance force generated by the rotor. Accordingly, it can be seen that the initial positioning of the weights in each pair of weights relative to one another may create a canceling force of equal magnitude to the unbalance. However, the desired 180° phase relationship between unbalance force and canceling force may not be present, in which case, it is necessary to move the weights with respect to the unbalance vector while maintaining the angular orientation between the pairs of weights so that their phase relationship is retained.

In FIGURE 7 there is shown a schematic view of an apparatus for controlling the angular orientation of the resultant canceling force and also means for changing the magnitude of the force. FIGURE 7 illustrates shaft 12 in spaced relationship with respect to weights 5′ and 5″ which are driven by synchro motors. In FIGURE 1, it has been noted that synchro generator 24 may be mechanically connected to the rotor. In normal operation the rotors of the synchro motors and synchro generators may be energized by a two-conductor alternating current source preferably of a frequency substantially higher than the shaft rotational frequency. The output of the synchro generator 24 is passed by means of conductors 52, 53, and 54 to the stator portions of differential transformers 50 and 51. Because it is desirable to change the angular orientation of the weights of each pair and also to move both pairs of weights in unison with respect to the unbalance of the rotor, the present differential transformer has a rotatably mounted stator which is adapted to be moved so that the stator windings of the transformers 50 and 51 may be moved in opposite directions. This action may be achieved by having the stator windings rotatably mounted and connected by a pair of gears 64 and 65 whereby rotation of the shaft 66 causes the stator windings to turn in opposite directions. For simplicity of operation, the differential transformer 29 illustrated in FIGURE 1 may be suitably calibrated so that this relative rotation between the stator windings is indicated on a dial or other indicia on the instrument. This calibration may be directly determined since it is a direct function of the angular orientation between the counterweights. Similarly, it is noted that it is also desirable to make the rotors of the particular differential transformers 50 and 51 movable in a manner that the phase relationship between the weights in each pair is maintained despite the movement of the rotors. This may be performed by having suitable friction-clutch connections with common shaft 63. The movement of shaft 63 may also be calibrated so that the magnitude and direction of the vector force applied to each pedestal may be directly read from the differential transformers.

The output of the first differential transformer, that is, from the rotor thereof, may be through conductors 56, 57, and 58 which are connected to the stators of the second pair of synchro motors of counterweight constructions 5″ and the output of the second differential transformer 51, namely, conductors 60, 61, and 62 may be connected to the first pair of synchro motors associated with counterweight constructions 5′.

It will be further appreciated that a similar construction as shown in FIGURE 7 may be utilized with synchro generator 23. In this manner, the differential transformers associated with each bearing pedestal provide a vector force of predetermined magnitude and of a desired angular orientation so that the canceling force generated at each pedestal is equal and opposite to the unbalance force generated in rotor 10. Another aspect of the present invention is that the forces generated by the canceling devices may be suitable selection of pulley sizes be supplied at speeds other than synchronous speed to cancel forces at other frequencies.

Another aspect of the invention is that the construction may be further utilized to ascertain continuously the magnitude and direction of unbalance forces in a machine. For example, the differential transformers illustrated in FIGURE 7 are directly calibrated to give magnitude and direction of the unbalance force. By utilization of suitable computing procedures and means, this unbalance vector as sensed by each pedestal may be translated into a balance weight mounted on the rotor in such a manner that the rotor is balanced for particular operating conditions.

While I have described preferred embodiments of my invention, it will be understood that my invention is not limited thereto since it may be otherwise embodied within the scope of the appended claims.

What I claim as new and desire to secure by Letters Patent of the United States is:

1. In combination, a rotor having a shaft, a bearing for supporting the shaft and force generating means associated with said bearing, said force generating means comprising rotatable weights, the axes of rotation of said weights being diametrically opposed with respect to the shaft axis, and means for driving the weights synchronously with the rotor to provide forces acting on the rotor tending to cancel unbalance therein.

2. In combination, a rotor having a shaft, a substantially rigidly mounted bearing for supporting the shaft, force generating means associated with said rigidly mounted bearing, said force generating means comprising a pair of rotatably mounted weights, the axes of rotation of said weights being diametrically opposed from the shaft axis, and means for driving the weights synchronously with the rotor to provide forces acting on the rotor tending to cancel unbalance therein.

3. In combination, a rotor having a shaft, a bearing for supporting said shaft, force generating means associated with said bearing, said force generating means comprising a pair of rotatable weights having substantially the same angular orientation, the axes of rotation of said weights being diametrically opposed from the shaft axis, and means for driving the weights in the same direction as the rotor to supply forces to the bearing tending to cancel unbalance in the rotor.

4. In combination, a rotor having a shaft, a bearing for supporting the shaft, said bearing being substantially rigidly mounted, force generating means associated with said rigidly mounted bearing, said force generating means comprising a pair of rotatable weights having substantially the same angular orientation, the axes of rotation of said weights being diametrically opposed from the shaft axis, and means for driving the weights in the same direction as the rotor to provide forces acting on the bearing tending to cancel unbalance in the rotor.

5. In combination, a rotor having a shaft, a bearing for supporting the shaft, force generating means associated with said bearing, said force generating means comprising two pairs of rotatable weights, the axes of rotation of each pair of rotatable weights being diametrically opposed from the shaft axis, and means for driving the weights in the same direction as the rotor in synchronism therewith to provide forces acting on the bearing tending to cancel unbalance in the rotor.

6. In combination, a rotor having a shaft, a bearing for supporting the shaft, said bearing being substantially rigidly mounted, force generating means associated with said bearing, said force generating means comprising a plurality of pairs of weights, the weights of each pair having the same angular disposition, the axes of rotation of each pair of weights being diametrically opposed from the shaft axis, and means for driving the weights in the same direction as the rotor in synchronism therewith to supply forces to the bearing tending to cancel unbalance in the rotor.

7. In combination, a rotor having a shaft, a bearing for supporting said shaft, force generating means associated with said bearing, said force generating means comprising a pair of rotatable weights whose axes of rotation are diametrically opposed from the shaft axis, means for driving the weights in synchronism with the rotor and means for changing the angular orientation of the pair of weights with respect to the shaft to supply forces to the bearing tending to cancel unbalance in the rotor.

8. In combination, a rotor having a shaft, a bearing supporting said shaft, said bearing being substantially rigidly mounted, force generating means associated with said substantially rigidly mounted bearing, said force generating means comprising a plurality of pairs of rotatable weights, the axes of rotation of each pair of weights being diametrically opposed from the shaft axis, each pair of weights having substantially the same angular orientation, means for driving the weights in synchronism with the rotor and means for changing the angular orientation of the pairs of weights relative to each other and to the shaft to provide forces acting on the bearing tending to substantially cancel the unbalance in the rotor.

9. In combination, a rotor having a shaft, a plurality of bearings for supporting said rotor, force generating means associated with each of said bearings, said force generating means comprising a pair of rotatable weights, the axes of rotation of said weights being diametrically opposed from the shaft axis, said weights having substantially the same angular orientation, and means for driving the weights in synchronism with the rotor, and means for changing the angular orientation of the weights with respect to the shaft to provide forces acting on the bearing tending to cancel the unbalance in the rotor.

10. In combination, a rotor having a shaft, a plurality of bearings for supporting said rotor, force generating means associated with said bearings, said force generating means comprising a plurality of pairs of rotatable weights, the axes of each pair of rotatable weights being diametrically opposed from the shaft axis, each pair of weights having substantially the same angular orientation, means for driving the weights in synchronism with the rotor and in the same direction, and means for changing the angular orientation of the pairs of weights relative to each other and to the shaft to provide forces acting on the bearing tending to cancel unbalance in the rotor.

11. In a method for canceling the unbalance in a rotor having a support, the steps which comprise in rotating a plurality of pairs of rotatable weights to provide a force acting on the support, varying the angular orientation of the pairs of weights relative to one another to generate an unbalance force on the support equal to the unbalance force generated by the rotor, and varying the orientation of the unbalance weights so that the resultant force generated by the weights is equal and opposite to the unbalance in the rotor to substantially cancel the unbalance in the rotor.

12. In a method for canceling the unbalance in a rotor having a support, the steps which comprise in rotating a plurality of pairs of rotatable weights in synchronism with the rotor to provide a force acting on the support, varying the angular orientation of the pairs of weights relative to one another to generate an unbalance force on the support equal to the unbalance force generated by the rotor, and varying the orientation of the unbalance weights so that the resultant force generated by the weights is equal and opposite to the unbalance in the rotor to substantially cancel the unbalance in the rotor.

13. In combination, a rotor having a shaft, a plurality of bearings for supporting said rotor, force generating means associated with each of said bearings, said force generating means comprising a pair of rotatable weights having the axes of rotation diametrically opposed from the axis, said weights having substantially the same angular orientation, means for driving the weights in synchronism with the rotor, means for changing the angular orientation of the weights with respect to the shaft to provide forces acting on the bearing tending to counteract periodic forces generated during rotation of the rotor, and means for continuously indicating the amount of correction supplied to cancel such periodic forces.

References Cited in the file of this patent

UNITED STATES PATENTS

| | | |
|---|---|---|
| 1,542,254 | Lanchester | June 16, 1925 |
| 1,625,259 | Johnson | Apr. 19, 1927 |
| 1,967,163 | Thearle | July 17, 1934 |
| 2,432,907 | Langer | Dec. 16, 1947 |
| 2,780,136 | Erban | Feb. 5, 1957 |
| 2,913,912 | Radermacher | Nov. 24, 1959 |